US006842006B2

(12) United States Patent
Conti et al.

(10) Patent No.: US 6,842,006 B2
(45) Date of Patent: Jan. 11, 2005

(54) MARINE ELECTROMAGNETIC MEASUREMENT SYSTEM

(75) Inventors: Ugo Conti, El Cerrito, CA (US); Edward Nichols, Berkeley, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 127 days.

(21) Appl. No.: 10/185,105

(22) Filed: Jun. 27, 2002

(65) Prior Publication Data

US 2004/0000912 A1 Jan. 1, 2004

(51) Int. Cl.[7] .............................. G01V 3/15; G01V 3/08
(52) U.S. Cl. ........................ 324/350; 324/348; 324/365
(58) Field of Search ................................. 324/348–350, 324/365; 367/15–16; 405/205, 208; 175/5; 114/312–315, 322, 244

(56) References Cited

U.S. PATENT DOCUMENTS

| | | | | |
|---|---|---|---|---|
| 3,514,693 | A | * | 5/1970 | Cagniard ..................... 324/350 |
| 4,617,518 | A | * | 10/1986 | Srnka .......................... 324/365 |
| 4,954,110 | A | * | 9/1990 | Warnan ........................ 441/22 |
| 5,022,012 | A | * | 6/1991 | Godfrey et al. ................. 367/3 |
| 5,327,089 | A | * | 7/1994 | Ouellette ..................... 324/345 |
| 5,770,945 | A | | 6/1998 | Constable |
| 5,959,548 | A | * | 9/1999 | Smith ...................... 340/854.8 |
| 6,628,119 | B1 | | 9/2003 | Eidesmo et al. |
| 6,639,333 | B1 | | 10/2003 | Kamata et al. |
| 6,677,757 | B2 | | 1/2004 | Fine et al. |
| 6,696,839 | B2 | | 2/2004 | Ellingsrud et al. |
| 6,717,411 | B2 | | 4/2004 | Ellingsrud et al. |

FOREIGN PATENT DOCUMENTS

| | | |
|---|---|---|
| EP | 0 590 795 | 4/1994 |
| EP | 0 913 555 | 5/1999 |
| GB | 1118509 | 7/1968 |
| WO | WO 01/57555 A1 | 8/2001 |
| WO | WO 02/14906 A1 | 2/2002 |
| WO | WO 03/034096 A1 | 4/2003 |
| WO | WO 03/048812 A1 | 6/2003 |
| WO | WO 03/104844 | 12/2003 |
| WO | WO 2004/008183 A2 | 1/2004 |
| WO | WO 2004/053528 | 6/2004 |

OTHER PUBLICATIONS

Petitt, Jr. et al. "Instrumentation to Measure Electromagnetic Fields on Continental Shelves," Proceedings of OCEANS '93 "Engineering in Harmony with Ocean," Oct. 18–21, 1993 vol. 1, pp. I–164–I–168.*

SC Constable, AS Orange GM Hoversten & HF Morrison, "Marine Magnetotellurics for Petroleum Exploration Part I: A Sea–Floor Equipment System," *Geophysics*, vol. 63, No. 3, pp. 816–825 (May–Jun. 1998).

* cited by examiner

Primary Examiner—Jay Patidar
Assistant Examiner—Darrell Kinder

(57) ABSTRACT

A sea-floor electromagnetic measurement device for obtaining underwater measurements of earth formations including a central structure and arms attached to the central structure so that they can pivot relative to the central structure. An electrode is attached to the end of each of the arms or to the central structure, and/or magnetometers are attached to the arms. A method for undertaking sea-floor electromagnetic measurements of earth formations including measuring electric fields at a selected distance from a central structure of an electromagnetic measurement system. Magnetic fields are then measured at the same location.

67 Claims, 6 Drawing Sheets

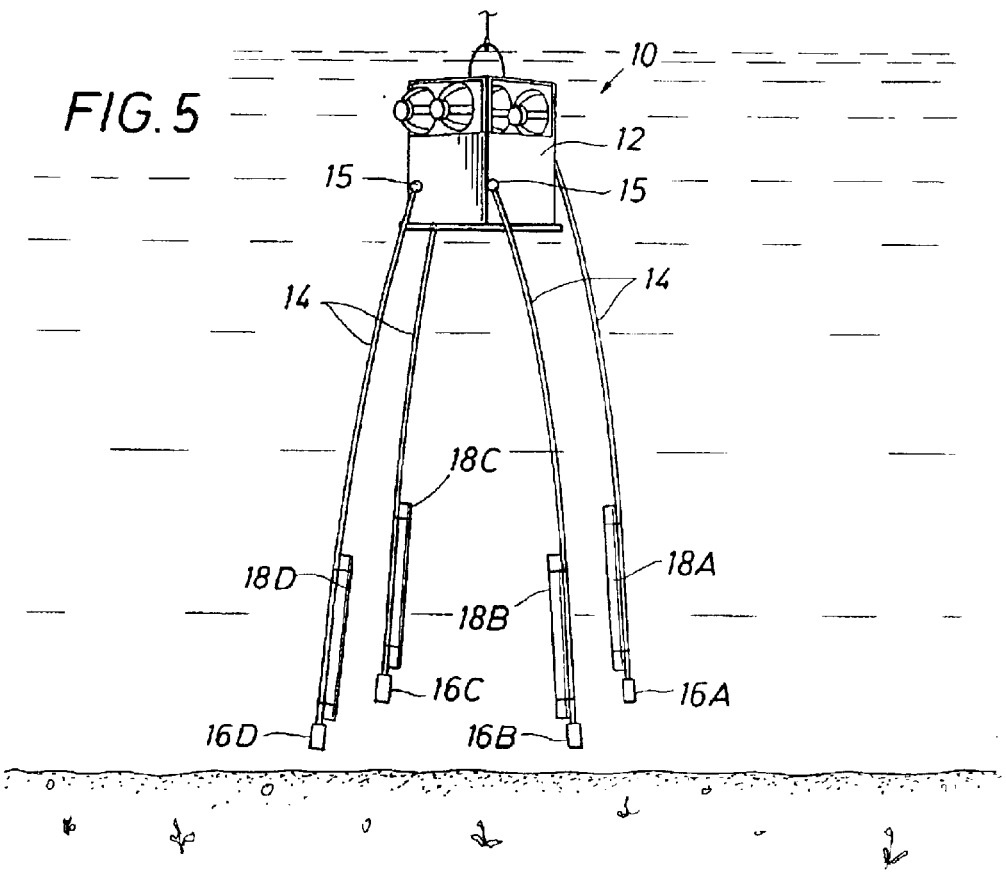
FIG. 5
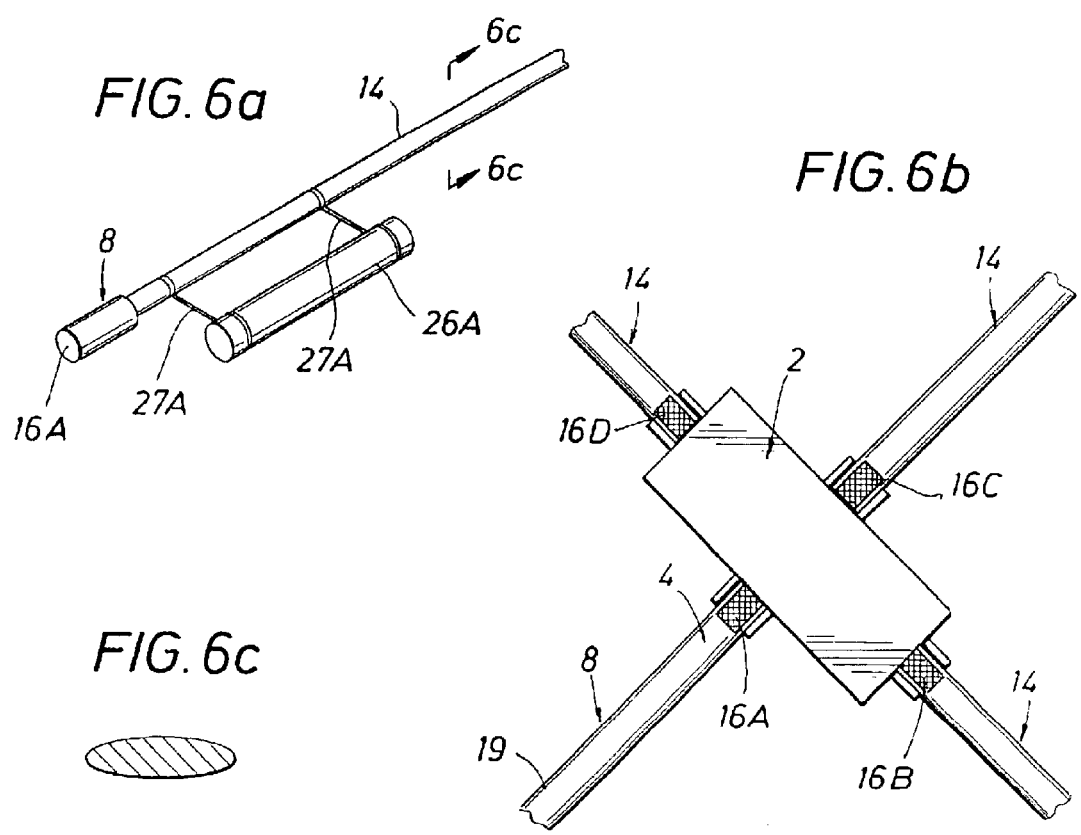
FIG. 6a
FIG. 6b
FIG. 6c

FIG.7
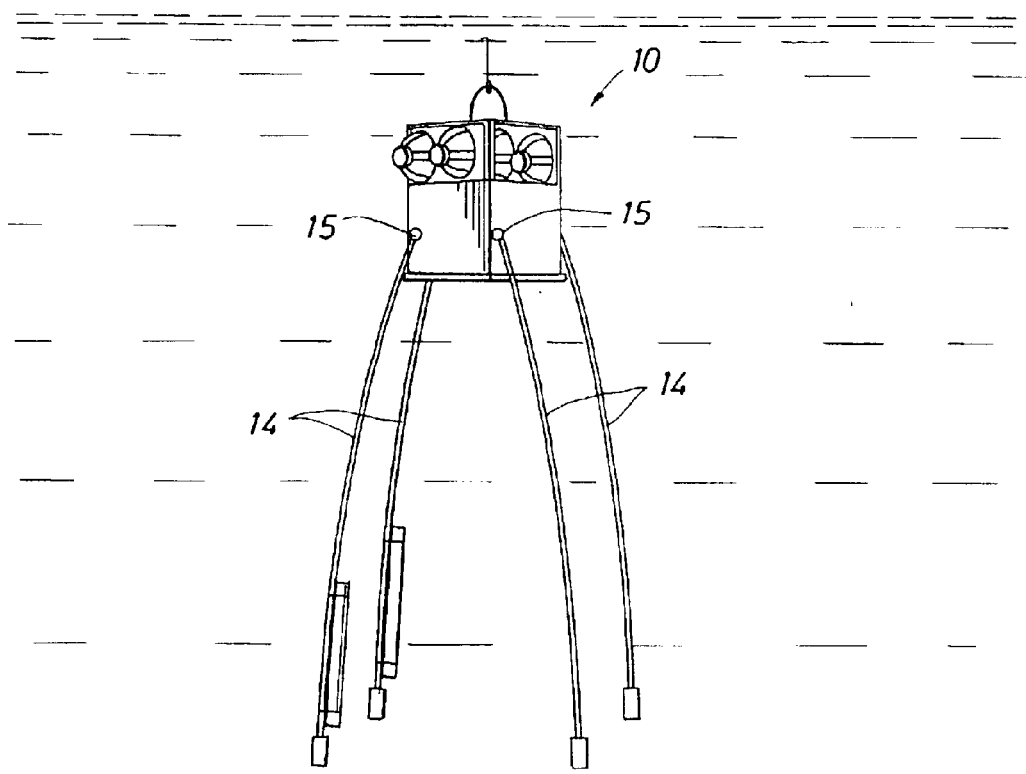
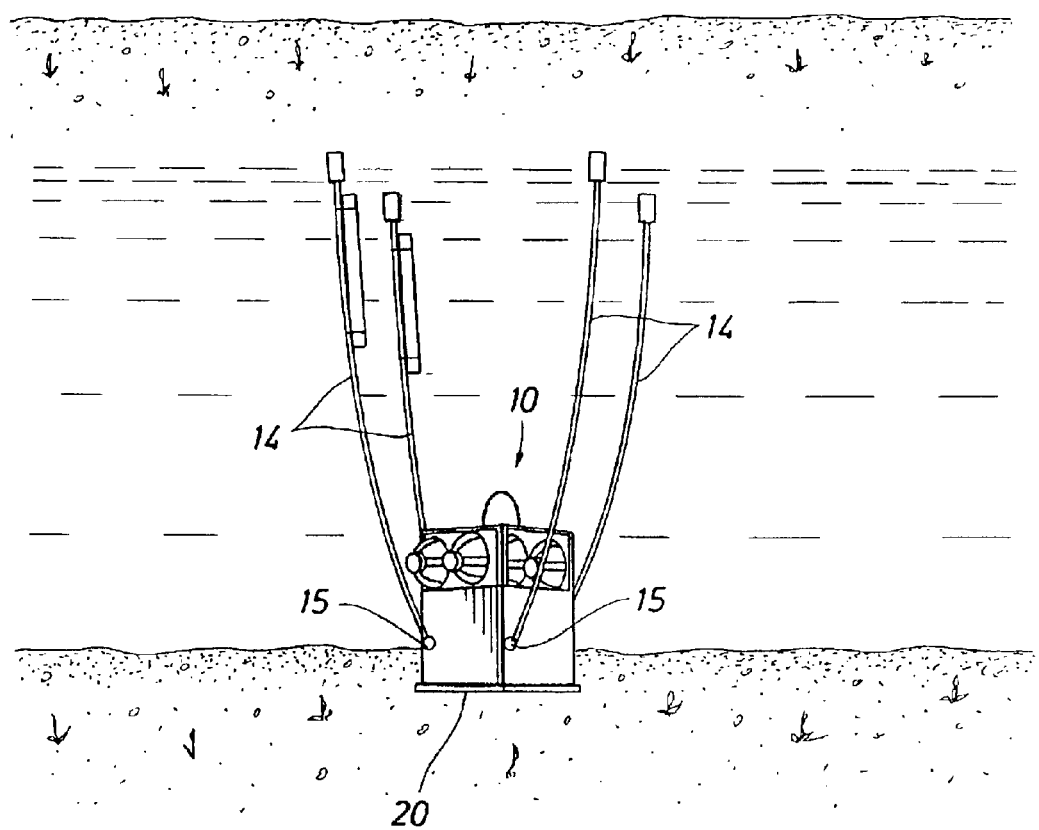
FIG.8

MARINE ELECTROMAGNETIC MEASUREMENT SYSTEM

BACKGROUND OF INVENTION

1. Field of the Invention

The invention relates generally to subsea exploration systems. More specifically, the invention relates to a marine electromagnetic measurement system and a method of deploying and retrieving the same. One application for electromagnetic measurement systems is as a marine magnetotelluric receiver.

2. Background Art

Magnetotelluric (MT) measurements are used to compute an electromagnetic impedance of selected earth formations. MT measurements are especially useful in regions where seismic imaging is inappropriate. For example, MT exploration is useful when evaluating geologic formations such as salts and carbonates. Salts, carbonates, and other particular formations may scatter seismic energy when seismic energy is propagated through them because of large velocity contrasts and inhomogeneties located within these formations, whereas the electromagnetic energy of the MT source fields propogates through these layers with less distortion. The MT method measures variations in the earth's magnetic and electric fields and does not use seismic energy to determine formation characteristics.

The MT method is typically used to measure an electromagnetic impedance as a function of frequency. Lower frequency provides a greater depth of penetration. The measured impedance may be transformed into an apparent resistivity and/or conductivity of the selected formations. Measuring impedance at several locations and at various frequencies enables a determination of resistivity and/or conductivity as a function of both depth and horizontal position. Therefore, the MT method may be used to evaluate formation resistivity over large areas of the seafloor. The formation resistivities of the various formations in a selected area may then be analyzed to determine the formation geometry, the presence or absence of hydrocarbons in selected formations, and the like.

The MT method is a passive method that uses natural variations in the earth's magnetic field as an energy source. The MT method includes a subsea system that detects orthogonal magnetic and electric fields proximate the seafloor to define a surface impedance. The surface impedance, as described above, may be measured over a broad range of frequencies and over a large area where layered formations act in a manner analogous to segments of an electrical transmission line. An MT method that operates according to the principles described above is generally disclosed in U.S. Pat. No. 5,770,945 issued to Constable. This type of electromagnetic receiver can also be used to record electromagnetic signals which originated from various kinds of transmitter systems such as a towed cable bipole or magnetic loop source.

In addition the receivers could be used to detect electromagnetic radiation originating from other types of signals such as emanating from naval ships (corrosion currents, electric circuits, generators, moving machinery) or from electric or magnetic sources located in boreholes or nearby land sources. The objective of these measurements could range from detailed exploration of the subsurface conductivity structure to monitoring naval traffic or operations to determining leakage signals from subsea cables.

The subsea system usually includes an apparatus such as an magnetotelluric (MT) measurement system 100 disclosed in the Constable patent and shown in FIG. 1. The MT measurement system 100 includes a body 102 having a battery pack (not shown), a data acquisition system 104, two orthogonally oriented magnetic sensors 122 and 124, and four arms 139, 140, 142, and 144, each of which includes an electrode 118, 119, 120, 121 mounted at the end thereof. The electrodes 118, 119, 120, 121 are silver-silver chloride electrodes, and the magnetic sensors 122, 124 are magnetic induction coil sensors.

The arms 139, 140, 142, 144 are five meters long and approximately 2 inches in diameter. The arms 139, 140, 142, 144 are typically formed from a semi-rigid plastic material (e.g., polyvinyl chloride or polypropylene) and are fixed to the body. The five meter length of the arms 139, 140, 142, 144 makes it difficult to store, deploy, and retrieve the MT system 100 from a surface vessel (not shown) because the arms 139, 140, 142, 144 are fixed with respect to the body 102 (as shown in FIG. 1). The arms 139, 140, 142, 144 are designed to rest on the seafloor when the MT system 100 is in place.

The body 102 is attached to a releasable concrete anchor 128 that helps the MT system 100 sink to the seafloor after deployment. The body 102 generally rests on top of the anchor 128 when it is positioned on the seafloor. The anchor 128 may be released after MT measurements have been completed so that the body 102 may rise to the surface and be retrieved by the surface vessel (not shown).

The system shown in FIG. 1, therefore, consists of two orthogonal electric dipoles and two orthogonal magnetic sensors. The magnetic sensors are located proximate the power supply and the data acquisition system. Because the magnetic sensors are very sensitive so as to detect small changes in the earth's magnetic field, the magnetic sensors may also detect equivalent magnetic fields generated by current flowing from the power supply to the data acquisition system and other electrical equipment. These equivalent magnetic fields may therefore contaminate the data and must be removed from the data using digital signal processing techniques.

Moreover, the magnetic sensors are extremely sensitive to noise. Any motion of the body and/or arms of the MT system caused by sea currents or marine life moving past the MT system as well as the motion of conductive fluid around the corresponding sensor can be detected. These fluctuations in the magnetic field are also recorded by the magnetic sensors and must be removed using signal processing techniques.

There is a need, therefore, for an MT system that is less sensitive to motion generated by subsea events and to equivalent magnetic fields produced by the flow of electric current from the power supply to, for example, the data acquisition system. Moreover, it would be advantageous to design a subsea MT system that is easy to store, deploy, and retrieve.

SUMMARY OF INVENTION

In one aspect, the invention comprises a sea-floor electromagnetic measurement device for obtaining underwater measurements of earth formations having a central structure; a plurality of arms pivotally coupled to the central structure, and an electrode coupled to each of the arms and/or at least two magnetometers coupled to the arms.

In another aspect, the invention comprises a sea-floor electromagnetic measurement device for obtaining underwater measurements of earth formations having a central structure; a plurality of arms pivotally coupled to the central structure; and an electrode and/or a magnetometer coupled to each the arms.

In another aspect, the invention comprises a sea-floor electromagnetic measurement device for obtaining underwater measurements of earth formations having a central structure; at least one arm pivotally coupled to the central structure; and an electrode and/or a magnetometer, coupled to the at least one arm.

In another aspect, the invention comprises a method of electromagnetic exploration. The method comprises measuring electric fields a selected distance from a central structure of a electromagnetic measurement system. Magnetic fields are then measured proximate the same location.

Other aspects and advantages of the invention will be apparent from the following description and the appended claims.

BRIEF DESCRIPTION OF DRAWINGS

FIG. 5 shows a perspective view of an embodiment of the invention.

FIG. 6a shows a perspective view of an embodiment of the invention.

FIG. 6b shows a perspective view of an arm according to an embodiment of the invention.

FIG. 6c shows a plain view of a cross section of an arm according to an embodiment of the invention.

FIG. 7 shows a perspective view of an EM system according to an embodiment of the invention after the system has been deployed into the sea.

FIG. 8 shows a perspective view of an embodiment of an EM system as it sinks to the seafloor.

DETAILED DESCRIPTION

Figure 1:
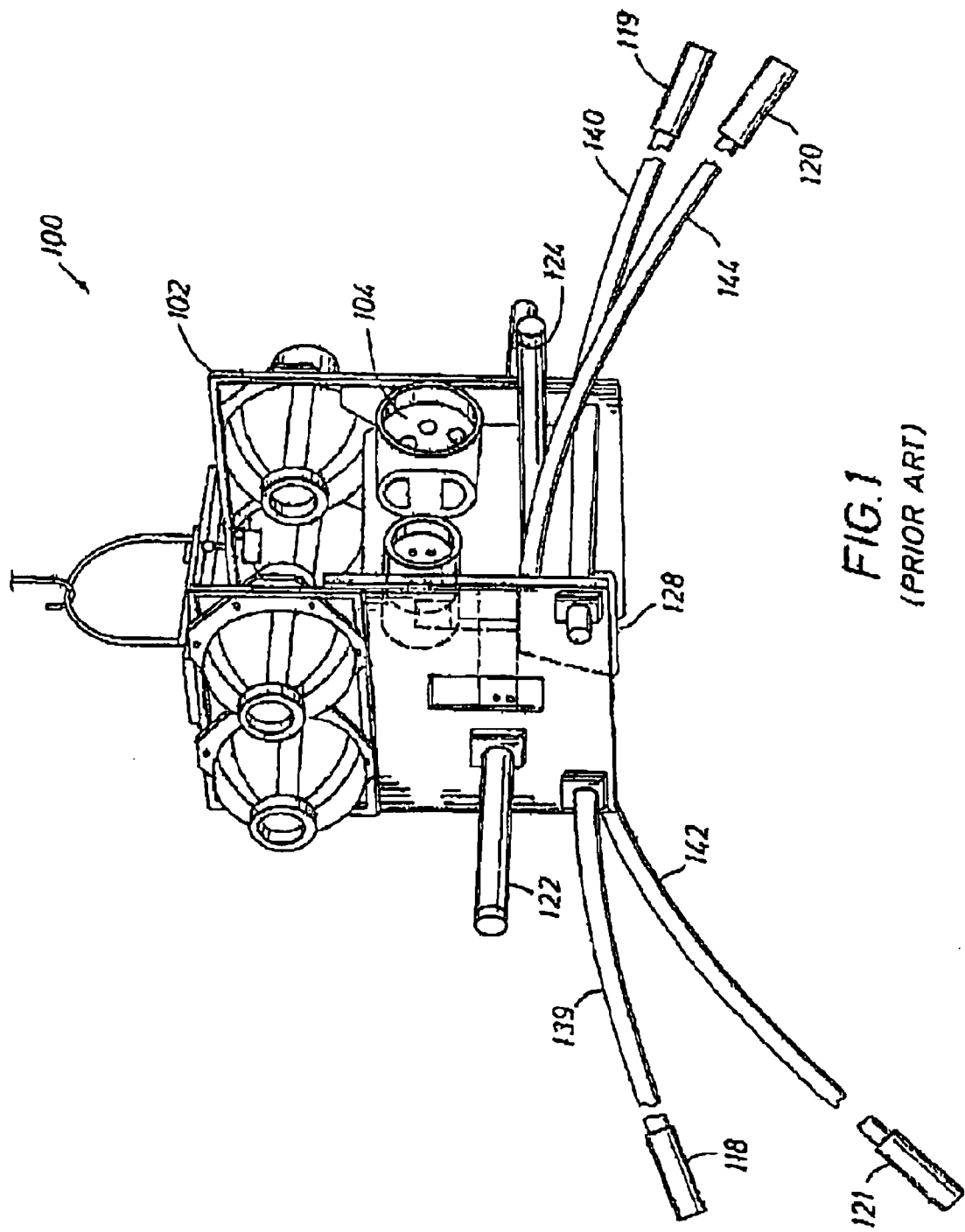
FIG. 1 shows a prior art MT system.
Figure 2A:
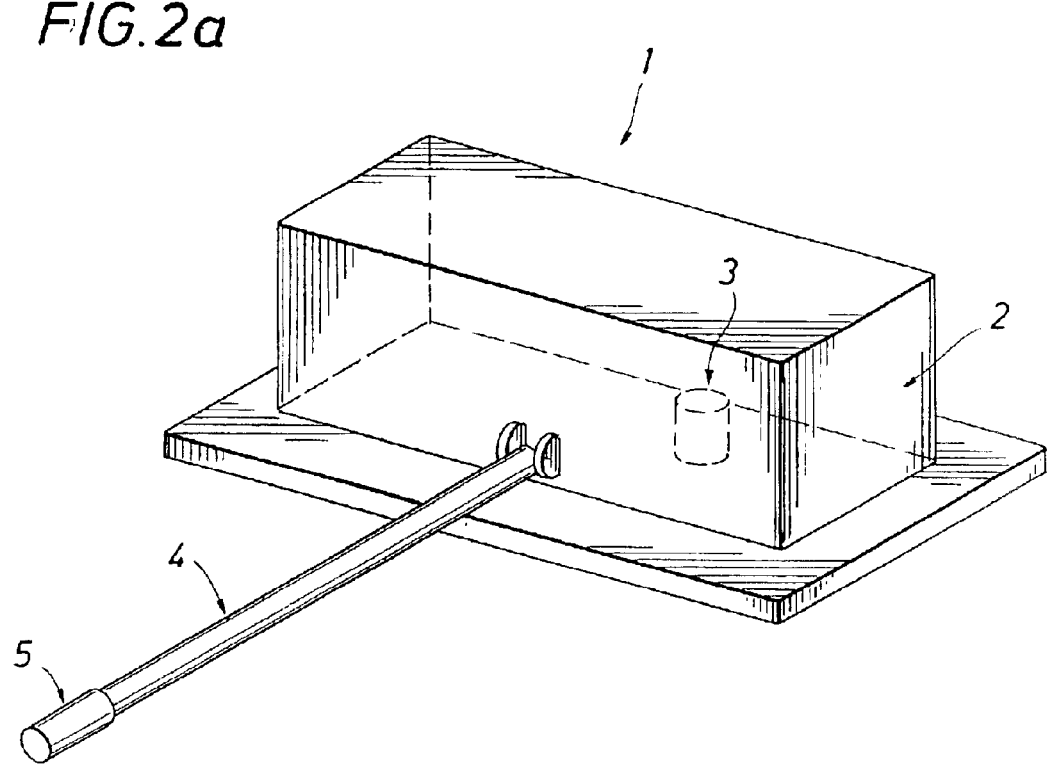
FIG. 2a shows a perspective view of an embodiment of the invention.
Figure 2B:
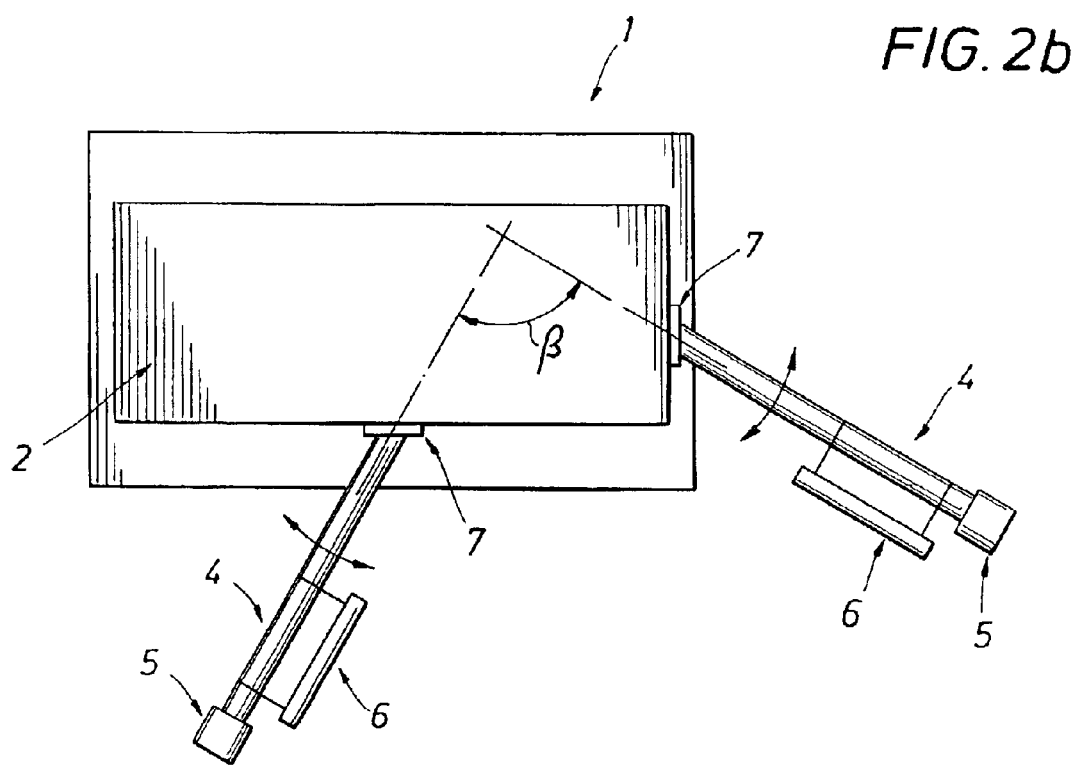
FIG. 2b shows a top view of an embodiment of the invention.

FIGS. 2a and 2b show subsea electromagnetic (EM) measurement systems according to the invention. FIG. 2a shows a subsea electromagnetic (EM) measurement system 1 that comprises a central structure 2 having an electrode 3 and attached to the central structure is at least one arm 4 pivotally coupled to the central structure 2. Electrode 3 can be at any location within the central structure 2. For example, electrode 3 can be attached to the central structure 2 and located within the interior end of arm 4, as shown in FIG. 6b. FIG. 2b shows a subsea electromagnetic (EM) measurement system 1 according to an embodiment of an invention, that comprises a central structure 2. A plurality of arms 4 is pivotally coupled to the central structure 2. An electrode 5 is coupled to each of the arms 4 proximate ends thereof, and at least two magnetometers 6 are coupled to the arms 4. The coupling 7 allows positioning the arms 4 and magnetometer 6 at substantially any angle (β) with respect to each other. According to the invention arms 4 can comprise at least one electrode and/or at least one magnetometer.

Figure 2C:
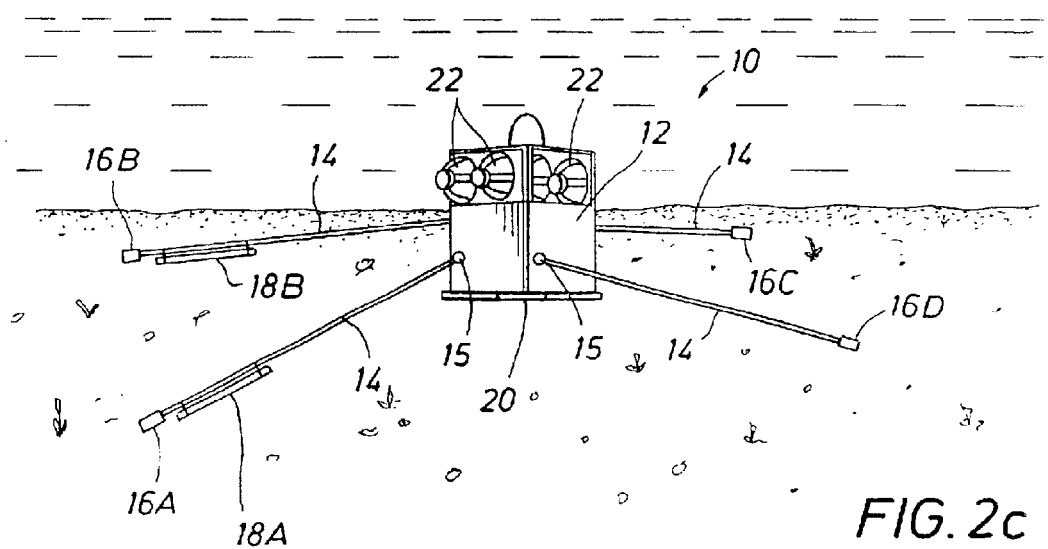
FIG. 2c shows a perspective view of an embodiment of the invention.

FIG. 2c shows a subsea electromagnetic (EM) measurement system 10 that includes at least one aspect of the present invention. The EM system 10 includes a central structure 12 that comprises electronic circuitry such as a power supply (not shown separately), a data acquisition system (not shown separately), a microprocessor (not shown separately), and related hardware and software (not shown separately). The central structure 12 generally includes communication equipment (not shown separately) so that the EM system may be remotely activated and deactivated. Moreover, the EM system 10 may also include, for example, navigation equipment such as a global positioning system (GPS) or other equipment (not shown separately) that enables location of the EM system 10 both before and after deployment into the sea. The power supply may comprise a battery pack or any other suitable power supply known in the art. Accordingly, aspects of the invention such as the foregoing electronic components of the central structure 12 are not intended to be limiting. Furthermore, it is contemplated that the central structure is simply a connection apparatus to the plurality of arms 14. Specifically, according to an embodiment, data acquisition and signal processing is performed at a remote location such as a ship, rig or a land based station. In such an embodiment, the central structure acts to connect the arms and receive signals from sensors for transmission to the remote location. The transmission can be via cable connected to the central structure or via wireless transmission.

A plurality of arms 14 (generally four as shown in FIG. 2c) are pivotally coupled to the central structure 12 using, for example, hinges 15. The hinges 15 allows the arms 14 to pivot in any direction such that arms 14 can be arranged at any angle with respect to each other. As will be discussed below, the hinges 15 enable the arms 14 to pivot so that the EM system 10 may be easily stored aboard a surface vessel, deployed in the sea, and retrieved from the seafloor. In some embodiments, the arms 14 comprise fiberglass rods. In some embodiments, the fiberglass rods that form the arms 14 have a circular cross-section, the diameter of which is within the range of approximately 0.25 inches to 0.75 inches. For example, one embodiment comprises fiberglass rods having cross-sectional diameters of ½ inch while another embodiment comprises diameters of ⅝ inch.

Further, other embodiments may comprise arms having non-circular cross-sections. For example, one embodiment comprises an arm having a substantially elliptical cross-section, as shown in FIG. 6c, that is adapted to minimize drag induced by seawater flow over the arm. Generally, regardless of the shape of the arms 14, the arms 14 are preferably designed to have a minimum cross-sectional area or are selectively shaped so that drag resulting from seawater flow over the arms 14 is minimized during deployment, emplacement, and retrieval of the EM system 10.

The arms 14 may also be formed from other materials (e.g., other than fiberglass). Generally, any suitable material known in the art may be used to form the arms. For example, the arms 14 may be formed from polymers, composite materials, and other non-conductive materials. Furthermore, flexible materials such as chains or conductive materials may be used to extend the location of the sensors in order to further enhance some advantages discussed herein, such as ease of storage. Accordingly, the type of material used to form the arms 14 is not intended to be limiting.

FIG. 6b shows one embodiment of the invention. The arms 14 can be nonconducting tubes with their free end 8 open permitting the entrance of seawater. The sea-water comes into contact, for example, with an inner electrode 16A which is electrically coupled to the central structure. The free open end can be closed and opened through valves that permit the entrance or exit of water as well as isolate the interior of the nonconducting tube from the exterior sea water. Valves (19) can be pressure or electronically operated. These type of tubes, with or without valves, are easier to deploy in certain instances and cheaper to manufacture and maintain.

Moreover, electrodes 16A, 16B, 16C and 16D can be located at the any position along the entire length of the arms 14. For example, the electrodes 16A, 16B, 16C and 16D can be located at the free end 8 of the arms 14 as shown in FIG. 2c. Also, according to an embodiment of the invention electrodes 16A, 16B, 16C, and 16D can be at any location between the free end of arms 14 and the central structure 2. Another embodiment according to the invention has electrodes 16A, 16B, 16C and 16D inserted opposite to the free end of arms 14 and attached to the central structure 2, as shown in FIG. 6b. The electrodes 16A, 16B, 16C and 16D can be coupled to the tubes by sliding them over the electrodes, reducing the amount of underwater connections and cables.

Figure 3:
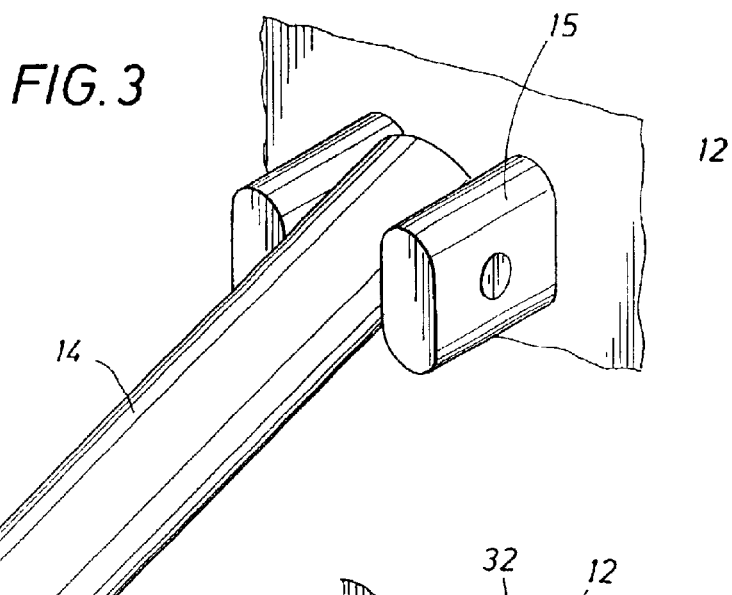
FIG. 3 shows a perspective view of a hinge according to an embodiment of the invention.
Figure 4:
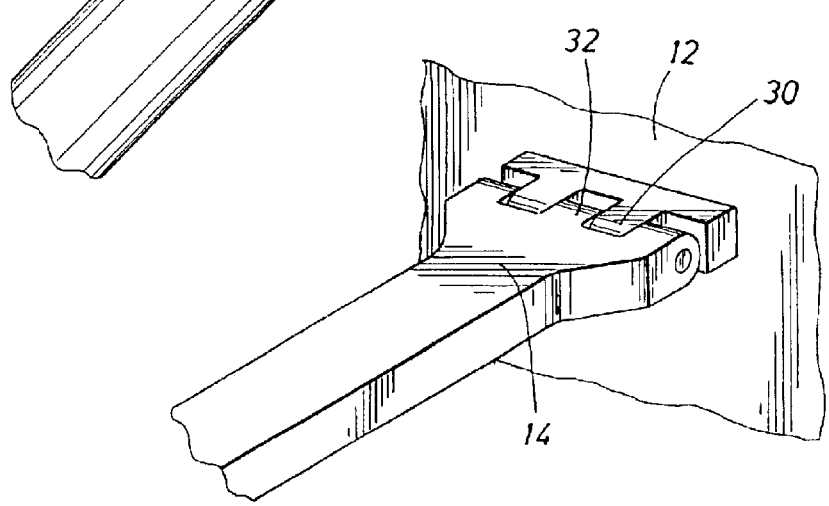
FIG. 4 shows a perspective view of a hinge according to an embodiment of the invention.

The hinges 15 may comprise a simple pinned connection as shown in FIG. 3. However, the hinges 15 may also be formed according to any suitable design known in the art. One embodiment of a hinge 30 that may be used with the invention is shown in FIG. 4. The hinge 30 comprises a wide attachment 32 that permits free vertical pivotal motion but distributes torsion of the hinge 30 (that may be caused by, for example, sea currents or the flow of seawater past the arm as the EM system is sinking to the seafloor or ascending to the sea surface) over a wider area. Distributing torsion over a wider area helps reduce the possibility that the hinge 30 will shear and fail. Further, the stabilized hinge 30 helps prevent additional, undesirable motion that could lead to anomalies in the measured magnetic field data when the EM system (10 in FIG. 2) is emplaced and operating on the seafloor (11 in FIG. 2).

Referring again to FIG. 2c, an anchor 20 is releasably coupled proximate a bottom of the central structure 12. The anchor 20 provides ballast that helps the EM system 10 sink to the seafloor after the EM system 10 is deployed into the sea. The anchor 20 may be released from the EM system 10 at a selected time when, for example, a command is sent from a microprocessor (not shown) to an attachment mechanism (not shown) that releasably couples the anchor 20 to the central structure 12. The attachment mechanism may be any suitable attachment mechanism known in the art, such as that disclosed in U.S. Pat. No. 5,770,945 issued to Constable.

Electrodes 16A, 16B, 16C, and 16D are generally coupled to the end of each of the arms 14. The electrodes 16A, 16B, 16C, 16D are positioned so as to form two electric dipoles in an "X" configuration, as shown in FIG. 2c. For example, electrodes 16A and 16C may form a first dipole, and electrodes 16B and 16D may form a second dipole. The electrodes 16A–D are primarily used in controlled source applications to receive electrical signals in response to remote transmission sources, such as sea-vessel cable towed systems. Such applications are well known in the industry, including DC or low frequency (less than 0.1 Hz) systems, induced polarization (IP) systems for measuring resistance changes over frequency and multiple controlled source transmissions. It should be noted that although the electrodes are discussed in the context of proximate arm mounting, electrode placement near or at the central structure is also contemplated with only minor adjustments and still achieving at least some of the advantages realized in the specific embodiments described herein.

Moreover, according to an embodiment of the invention, a magnetometer 18A, 18B is generally coupled to each of at least two of the arms 14 so as to form an orthogonal magnetic field measurement system. The arms 14 are adapted to pivot about the hinges 15 so that the electrodes 16A, 16B, 16C, 16D and the magnetometers 18A, 18B rest on the seafloor 11 when the EM system 10 is emplaced in a selected position.

It should be understood that although the system described in conjunction with a preferred embodiment having both magnetotelluric and controlled source electromagnetic measurement systems, the disclosed subject matter and the associated advantages do not require combined use of a magnetometer system and an electrode system. Specifically, a magnetotelluric measuring system having a magnetometer system without the controlled source electrode system and a system incorporating only the electrode system both benefit from the disclosed subject matter.

The arms 14 are designed to have a selected length that is great enough to position the magnetometers 18A, 18B a sufficient distance from the central structure 12 so that magnetic fields generated by the flow of current in the electrical systems of the central structure 12 are substantially undetected by the magnetometers 18A, 18B. The amplitude of the magnetic fields generated proximate the central structure 12 and measured by the magnetometers 18A, 18B is inversely proportional to the cube of the distance between the magnetometers 18A, 18B and the central structure 12. Thus, positioning the magnetometers 18A, 18B proximate the ends of the arms 14 (e.g., a distance that is generally several meters from the central structure 12) effectively eliminates the interference and "noise" generated by the magnetic fields in the central structure 12. In some circumstancesattenuation of the magnetic interference signals by more than 40 dB has been observed when the recording systems were moved from the center of the structure to the arms.

According to an embodiment, the magnetometers 18A and 18B comprise dB/dt induction sensors. These induction sensors are based on the induction of an electromotive force due to a time varying magnetic flux. Although any number of magnetometer technologies may be used, including feedback-type sensors, dB/dt induction sensors provide certain advantages including simplified construction and increased reliability. Fluxgate are also appropriate according to an embodiment of the invention. Furthermore, various magnetometer designs include different configuration to account for pressure effects to the sensor. For example, the magnetometers may be placed in an electrically conductive pressure case or internally pressure compensated. In this way, the disclosed subject matter is not limited to any particular type of magnetometer.

Positioning the magnetometers 18A, 18B proximate the ends of the arms 14 (which are generally relatively light and flexible) also adds extra mass to the ends of the arms 14 that helps ensure that the magnetometers 18A, 18B will contact and/or be partially embedded in the seafloor 11 when the EM system 10 is emplaced. Increasing the mass positioned proximate the ends of the arms 14 helps improve mechanical stability by firmly holding the arms 14 in place so that the flow of seawater or the movement of marine life past the arms 14 and magnetometers 18A, 18B does not produce additional movement of the arms 14 or EM system 10 that could introduce anomalies into recorded magnetic field data.

Another embodiment of the invention, shown in FIG. 5, comprises four magnetometers 24A, 24B, 24C, and 24D each disposed proximate the end of each of the arms 14 so as to form two orthogonal pairs of magnetometers. The use of two pairs of magnetometers 24A, 24B, 24C, 24D provides an extra orthogonal magnetic field measurement system that enables recording of redundant data, thereby increasing the reliability of the recorded data and providing an additional set of measurements that may be useful to decrease and/or filter out noise, anomalies, and the like.

An embodiment of mounting a magnetometer to an arm is shown in FIG. 6a. The magnetometer 26A is coupled to the arm 14 using a flexible cable 27A. This embodiment further isolates the magnetometer 26A from the motion of the arm 14 and the EM system (10 in FIG. 2c) so that the magnetometer 26A is substantially completely dynamically decoupled from other elements of the EM system (10 in FIG. 2c). However, the cable 27A has a stiffness selected so that the magnetometer 26A substantially maintains the desired geometric relationship. A similar arrangement may be used with other magnetometers (e.g., magnetometer 18A shown in FIG. 2c) coupled to other arms.

Moreover, each magnetometer can include a tiltmeter for measuring the inclination of each magnetometer with respect to the seafloor.

FIG. 7 shows a view of the embodiment shown in FIG. 2c as the EM system 10 is being deployed into the sea. The arms 14 generally pivot downward about the hinges 15 because of gravity when the EM system 10 is lifted to an elevated position above the sea surface. A crane (not shown) then lowers the EM system 10 into the sea and releases the EM system so that it may sink to a selected position on the seafloor (11 in FIG. 2c).

FIG. 8 shows a view of the EM system 10 as it sinks to the seafloor (11 in FIG. 2c). The arms 14 generally pivot upward about the hinges 15 (e.g., because of the drag exerted by the passage of the arms through the seawater) so that the central structure 12 and anchor 20 precede the arms 14 to the seafloor (11 in FIG. 2c). The ability of the arms 14 to pivot reduces a "drag footprint" of the EM system 10 in that the arms 14, in the upward pivoted or "folded" position, are generally subject to less drag (e.g., than if they were fixedly connected to the central structure 12 and not able to pivot). The drag reduction reduces the time it takes for the EM system 10 to sink to the seafloor (11 in FIG. 2c). As shown in FIG. 2c, when the central structure 12 and anchor 20 come to rest on the seafloor 11, the arms 14, including the electrodes and magnetic sensors, pivot downward about the hinges 15 so that they lay on the seafloor 11 and form the "X" shaped dipole pair.

Figure 9:
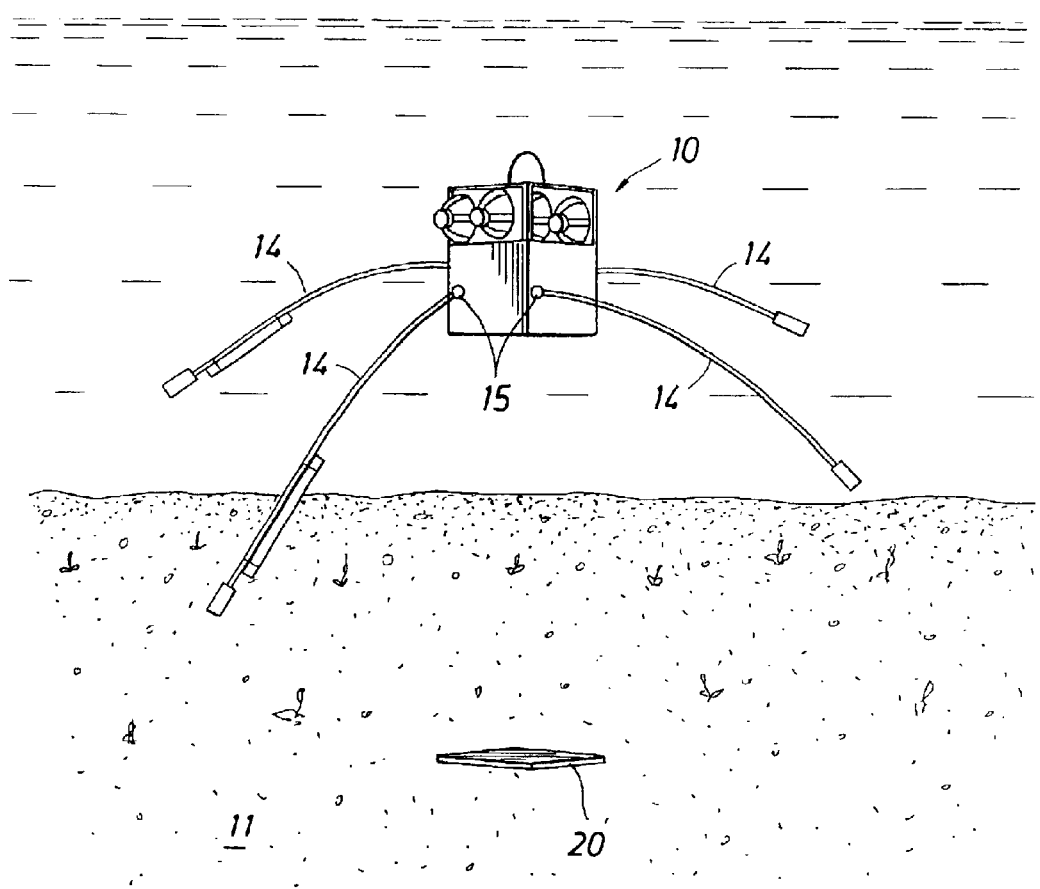
FIG. 9 shows a perspective view of an embodiment of an EM system as it ascends to the surface.

After electromagnetic (EM) measurements have been completed, the anchor (20 in FIG. 2c) is separated from the central structure (12 FIG. 2c) at a selected time as described above. The central structure (12 FIG. 2c) comprises a plurality of flotation devices (22 FIG. 2c) coupled thereto so that the EM system (10 FIG. 2c) is buoyant after the anchor (20 FIG. 2c) has been released. The flotation devices (22 FIG. 2c) may contain air or any other suitable gas or buoyant material. Accordingly, after the anchor (20 FIG. 2c) has been released, the EM system (10 FIG. 2c) begins to ascend to the surface of the sea. As shown in FIG. 9, the arms 14 generally pivot downward about the hinges 15 as the EM system rises to the sea surface. Once again, the reduction in drag produced by the ability of the arms 14 to pivot at the hinges 15 reduces the ascent time of the EM system 10 and may reduce the number and/or size of the flotation devices 22 required to lift the EM system 10 to the surface. Once at the surface, the EM system 10 may be retrieved by a surface vessel (not shown) so that data may be retrieved and the like.

Advantageously, the EM system described herein is easy to store, deploy, and retrieve because the arms of the EM system can pivot relative to the central structure. The EM system provides a stable magnetic field measurement platform that is less susceptible to anomalies caused by sea currents and marine life because the magnetic sensors are substantially dynamically decoupled from the central structure. Accordingly, the EM system described herein may produce more accurate measurements of formation resistivity and/or conductivity and may ease the process of subsea electromagnetic exploration.

Finally, the system and method described herein can be used not just for electromagnetic measurements, but all kinds of controlled source electromagnetics, marine DC resistivity or marine impedance measurements. It is also applicable to to earthquake monitoring for remote sites that are doing underwater surveillance for marine activity or for marine monitoring applications.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A sea-floor electromagnetic measurement device for obtaining underwater measurements of earth formations, comprising:
   a central structure;
   a plurality of arms having a first end and a second end, the second end pivotally coupled to the central structure, the first end being a free end;
   at least one electrode coupled to each of the arms; and
   at least two magnetometers coupled to ones of the arms, wherein the magnetometers are positioned a selected distance from the central structure so that magnetic fields produced by electric currents in the central structure do not substantially affect the measurements made by the magnetometers.

2. The measurement device of claim 1, wherein the plurality of arms comprises four arms arranged so as to form a cross dipole pattern.

3. The measurement device of claim 1, wherein each electrode is disposed proximate the first end of each arm.

4. The measurement device of claim 1, wherein each of the arms comprises a cross-section adapted to minimize drag when the measurement device is deployed in and retrieved from the sea.

5. The measurement device of claim 1, wherein each of the arms comprises a substantial elliptical cross section.

6. The measurement device of claim 1, wherein the arms are adapted to pivot in a vertical direction with respect to the central structure.

7. The measurement device of claim 1, wherein the electrodes and the magnetometers are substantially dynamically decoupled from the central structure.

8. The measurement device of claim 1, wherein each of the plurality of arms comprises a fiberglass rod.

9. The measurement device of claim 1, wherein each magnetometer comprises a tiltmeter.

10. The measurement device of claim 1 wherein the at least two magnetometers are positioned orthogonally with respect to each other.

11. The measurement device of claim 1 wherein the magnetometers are pressure compensated.

12. The measurement device of claim 1 wherein the magnetometers are dB/dt induction sensors.

13. The measurement device of claim 1, wherein the at least two magnetometers are disposed proximate the first ends of adjacent arms.

14. The measurement device of claim 13, wherein the at least two magnetometers are coupled to the arms by cables.

15. The measurement device of claim 1, wherein to second end of each arm is pivotally coupled to the central structure with a hinge.

16. The measurement device of claim 15, wherein each hinge is adapted to distribute torsional forces generated by motion of the arms relative to the central structure.

17. The measurement device of claim 1, further comprising electronic circuitry adapted to control the measurement system and to record at least one of electric field measurements of the electrodes and magnetic field measurements of the magnetometers.

18. The measurement device of claim 17 wherein the circuitry is adapted to transmit the at least one of electric and magnetic measurements to a remote location.

19. The measurement device of claim 17 wherein the circuitry is adapted to record the at least one of electric and magnetic measurements in response to a remote location.

20. The measurement device of claim 1 wherein each arm comprises a tube, the second end pivotally coupled to the central structure and the first end comprising an opening to allow the entrance of ocean water.

21. The measurement device of claim 20 wherein each electrode is included inside each tube proximate to the second end thereof.

22. The measurement device of claim 21 wherein each electrode is coupled to the central structure.

23. A sea-floor electromagnetic measurement device for obtaining underwater measurements of earth formations, comprising:
a central structure;
a plurality of arms having a first end and a second end, the second end pivotally coupled to the central structure, the first end being a free end; and
at least one of an electrode and a magnetometer coupled to each of the arms; and wherein the magnetometer is positioned a selected distance from the central structure so that magnetic fields produced by electric currents in the central structure do not substantially affect the measurements made by the magnetometer.

24. The measurement system of claim 23, wherein the plurality of arms comprises four arms arranged so as to form a cross dipole pattern.

25. The measurement device of claim 23, wherein each electrode is disposed proximate the first end of each arm.

26. The measurement device of claim 23, wherein each of the arms comprises a cross-section adapted to minimize drag when the measurement device is deployed in and retrieved from the set.

27. The measurement device of claim 23, wherein each of the arms comprises a substantially elliptical cross-section.

28. The measurement device of claim 23, wherein the arms are adapted to pivot in a vertical direction with respect to the central structure.

29. The measurement device of claim 23, wherein the electrodes and the magnetometers are substantially dynamically decoupled from the central structure.

30. The measurement system of claim 23, wherein each of the plurality of arms comprises a fiberglass rod.

31. The measurement device of claim 23, wherein each magnetometer comprises a tiltmeter.

32. The measurement device of claim 23, further comprising two magnetometers positioned orthogonally with respect to each other.

33. The measurement device of claim 23 wherein the magnetometer is pressure compensated.

34. The measurement device of claim 23 wherein the magnetometer is a dB/dt induction sensor.

35. The measurement device of claim 23, wherein each magnetometer is disposed proximate the first ends of adjacent arms.

36. The measurement device of claim 35, wherein each magnetometer is coupled to a corresponding one of the arms by cables.

37. The measurement device of claim 23, wherein the second end of each of the arms is pivotally coupled to the central structure with a hinge.

38. The measurement device of claim 37, wherein each hinge is adapted to distribute torsional forces generated by motion of the arms relative to the central structure.

39. The measurement device of claim 23, further comprising electronic circuitry adapted to control the measurement device and to record at least one of electric field measurements of the electrodes and magnetic field measurements of the magnetometers.

40. The measurement device of claim 39 wherein the circuitry is adapted to transmit the at least one of electric and magnetic fields measurements to a remote location.

41. The measurement device of claim 39 wherein the circuitry is adapted to record the at least one of electric and magnetic fields measurements in response to a remote location.

42. The measurement device of claim 23 wherein each arm comprises a tube, the second end pivotally coupled to the central structure and the first end comprising an opening to allow the entrance of ocean water.

43. The measurement device of claim 42 wherein cash electrode is included inside each tube proximate to the second end thereof.

44. The measurement device of claim 43 wherein each electrode is coupled to the central structure.

45. A sea-floor electromagnetic measurement device for obtaining underwater measurements of earth formations, comprising:
a central structure;
at least one arm, having a first end and a second end, the second end pivotally coupled to the central structure, the first end being a free end; and
at least one of an electrode and a magnetometer, coupled to the at least one arm; and wherein the magnetometer is positioned a selected distance from the central structure so that magnetic fields produced by electric currents in the central structure do not substantially affect the measurements made by the magnetometer.

46. The measurement device of claim 45, wherein the electrode is disposed proximate the first end of the at least one arm.

47. The measurement device of claim 45, wherein the at least one arm comprises a cross-section adapted to minimize drag when the measurement device is deployed in and retrieved from the sea.

48. The measurement device of claim 45, wherein the at lest one arm comprises a substantially elliptical cross-section.

49. The measurement device of claim 45, wherein the at least one arm is adapted to pivot in a vertical direction with respect to the central structure.

50. The measurement device of claim 45, wherein the electrode and the magnetometer are substantially dynamically decoupled from the central structure.

51. The measurement device of claim 45, wherein the at least one arm comprises a fiberglass rod.

52. The measurement device of claim 45, wherein the magnetometer comprises a tiltmeter.

53. The measurement device of claim 45 wherein the magnetometer is pressure compensated.

54. The measurement device of claim 45 wherein the magnetometer is a dB/dt induction sensor.

55. The measurement device of claim 45, wherein the magnetometer is disposed proximate the first end of the at least one arm.

56. The measurement device of claim 55, wherein the magnetometer is coupled to the arm by cables.

57. The measurement device of claim 45, wherein the second end of the at least one arm is pivotally coupled to the central structure with a hinge.

58. The measurement device of claim 57, wherein the binge is adapted to distribute torsional forces generated by motion of the arm relative to the central structure.

59. The measurement device of claim 45 wherein the at least one arm comprises a tube, the second end pivotally coupled to the central structure and the first end comprising an opening to allow the entrance of ocean water.

60. The measurement device of claim 59 wherein each electrode is included inside each tube proximate to the second end thereof.

61. The measurement device of claim 60 wherein each electrode is coupled to the central structure.

62. The measurement device of claim 45, further comprising electronic circuitry adapted to control the measurement device and to record at least one of electric field measurements of the electrodes and magnetic field measurements of the magnetometers.

63. The measurement device of claim 62 wherein the circuitry is adapted to transmit the at least one of electric and magnetic fields measurements to a remote location.

64. The measurement device of claim 62 wherein the circuitry is adapted to record the at least one of electric and magnetic fields measurements in response to a remote location.

65. A method of undertaking sea-floor electromagnetic measurements, the method comprising:

measuring components of magnetic fields at a location a selected distance from a central structure of an electromagnetic measurement system so that magnetic fields produced by electric currents in the central structure substantially do not affect the measurements made by a magnetometer; and measuring electric fields proximate the same location.

66. The method of claim 65 wherein the electric fields are cross dipole electric fields.

67. The method of claim 65 wherein the components of magnetic fields are orthogonal.

* * * * *